US008289583B2

(12) United States Patent
Hattori

(10) Patent No.: US 8,289,583 B2
(45) Date of Patent: Oct. 16, 2012

(54) IMAGE PROCESSING METHOD AND COMPUTER-READABLE STORAGE MEDIUM

(75) Inventor: Yusuke Hattori, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 646 days.

(21) Appl. No.: 12/431,487

(22) Filed: Apr. 28, 2009

(65) Prior Publication Data

US 2009/0273815 A1 Nov. 5, 2009

(30) Foreign Application Priority Data

Apr. 30, 2008 (JP) ................ 2008-118822

(51) Int. Cl.
*H04N 1/00* (2006.01)
*H04N 1/04* (2006.01)
*H04N 1/40* (2006.01)
*H04N 1/32* (2006.01)

(52) U.S. Cl. ......... 358/474; 358/404; 358/468; 358/444
(58) Field of Classification Search .................. 358/474, 358/450, 505, 444, 404, 1.14
See application file for complete search history.

(56) References Cited

U.S. PATENT DOCUMENTS

| 7,292,378 B2 * | 11/2007 | Chiba et al. .................. 358/473 |
| 2005/0141044 A1 | 6/2005 | Morita |
| 2009/0273815 A1 * | 11/2009 | Hattori ......................... 358/450 |
| 2011/0181918 A1 * | 7/2011 | Motoyama .................... 358/404 |

FOREIGN PATENT DOCUMENTS

| JP | H11-355481 A | 12/1999 |
| JP | 2000-059561 A | 2/2000 |
| JP | 2000-326595 A | 11/2000 |
| JP | 2002-016756 A | 1/2002 |
| JP | 2003-087494 A | 3/2003 |
| JP | 2005-167938 A | 6/2005 |
| JP | 2006-203741 A | 8/2006 |

* cited by examiner

*Primary Examiner* — Jerome Grant, II
(74) *Attorney, Agent, or Firm* — Canon U.S.A., Inc. IP Division

(57) ABSTRACT

In a control method for a processing apparatus connected to an image reading apparatus, in a case where the processing apparatus receives a cancellation instruction while the image reading apparatus performs a reading step, the processing apparatus causes the image reading apparatus to terminate the reading step and deletes image data of a page being read, and in a case where the processing apparatus receives a cancellation instruction after the image reading apparatus has performed the reading step, the processing apparatus performs controlling processing for deleting image data that has been acquired in the last reading step and has yet to be stored.

5 Claims, 9 Drawing Sheets

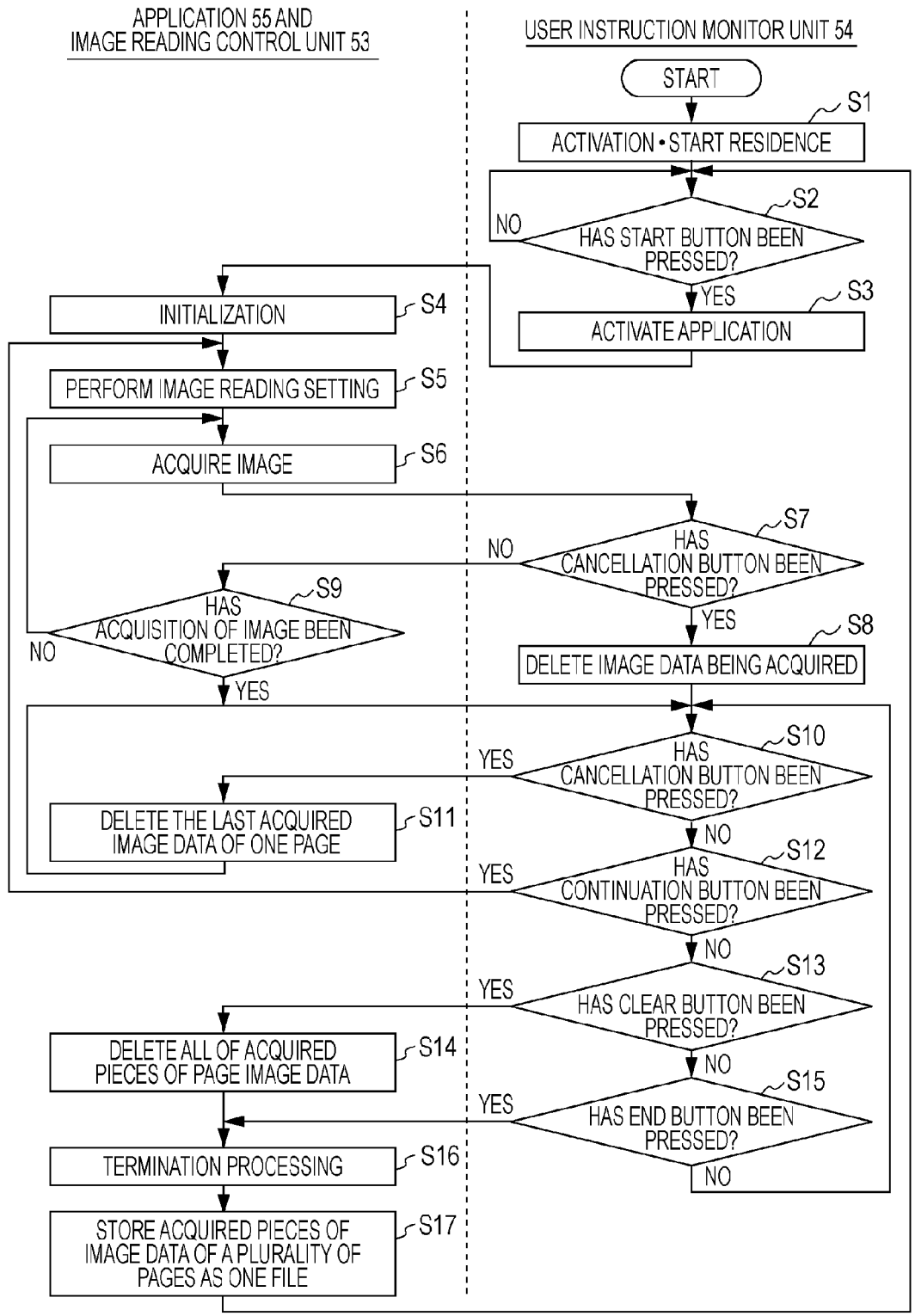

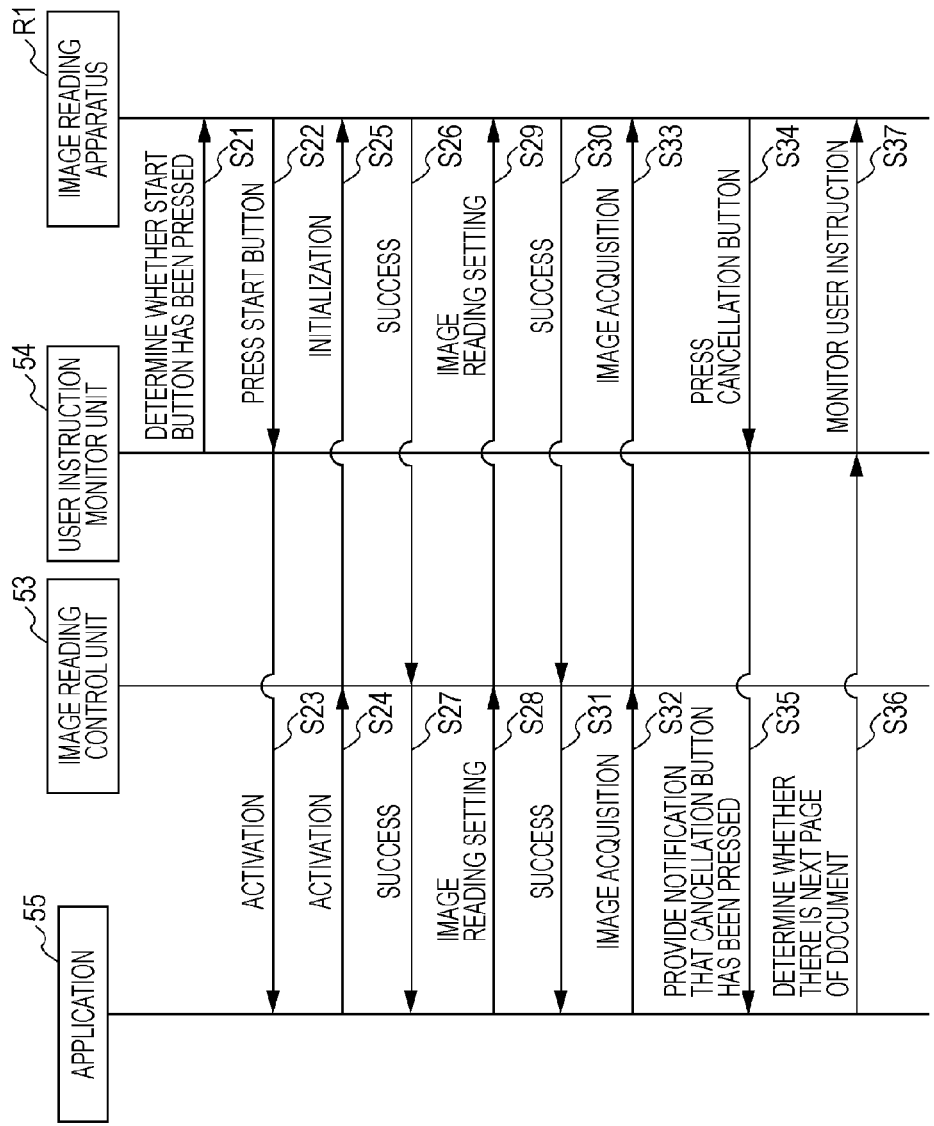

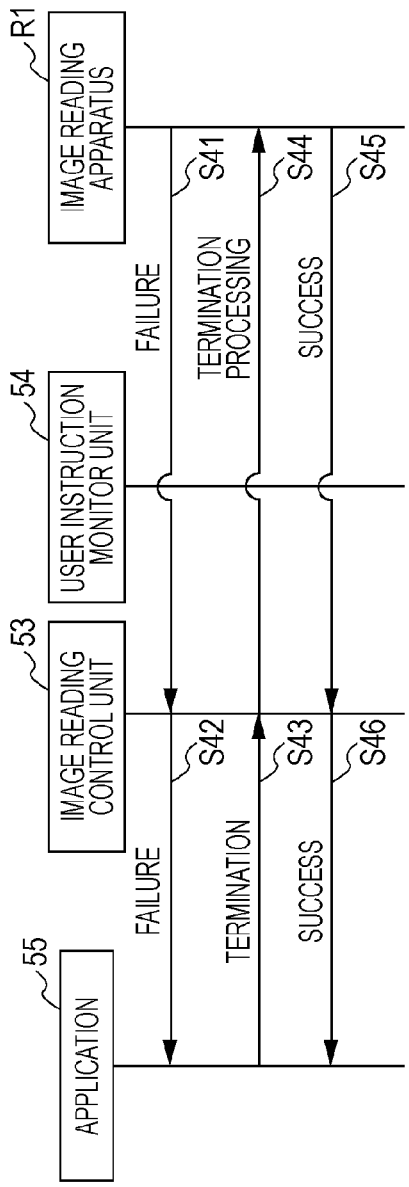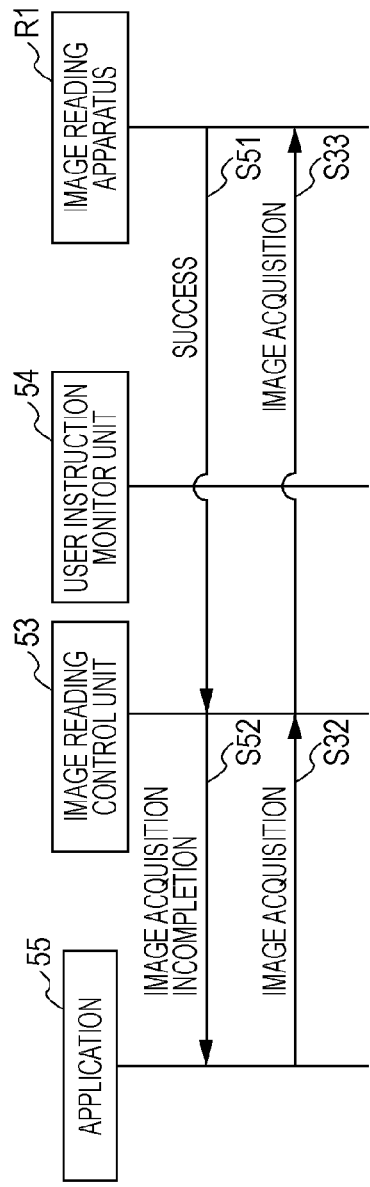

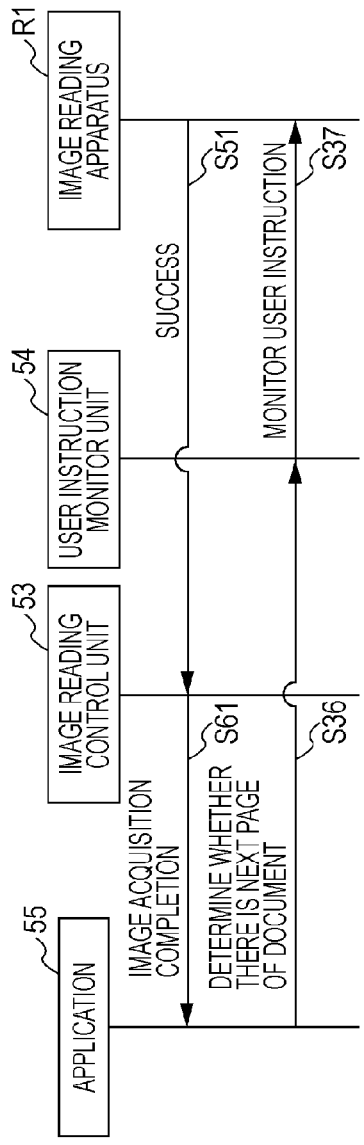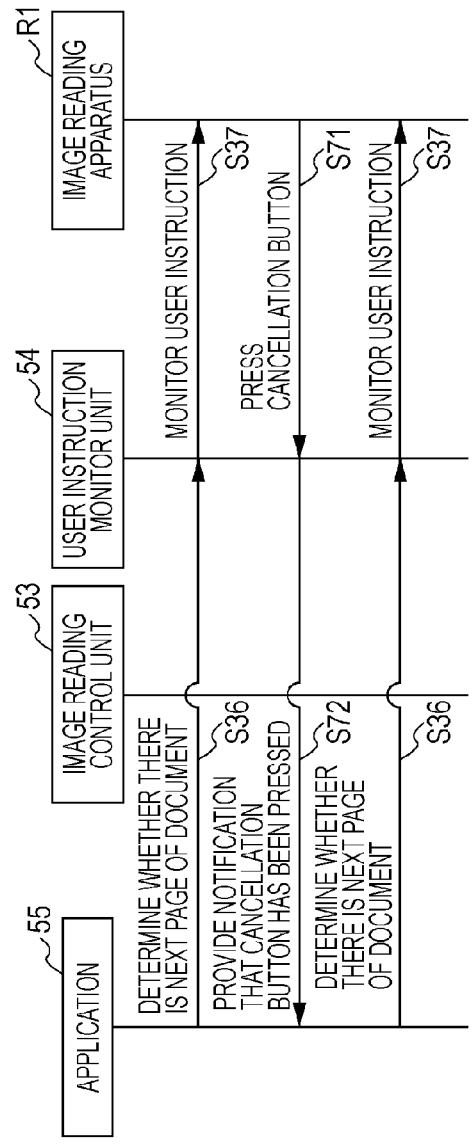

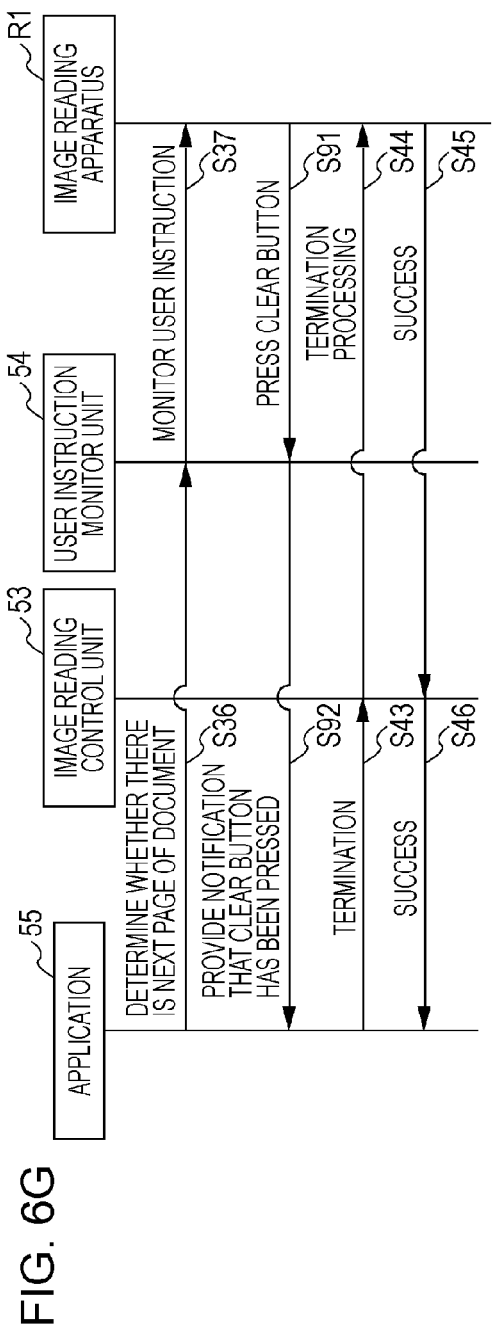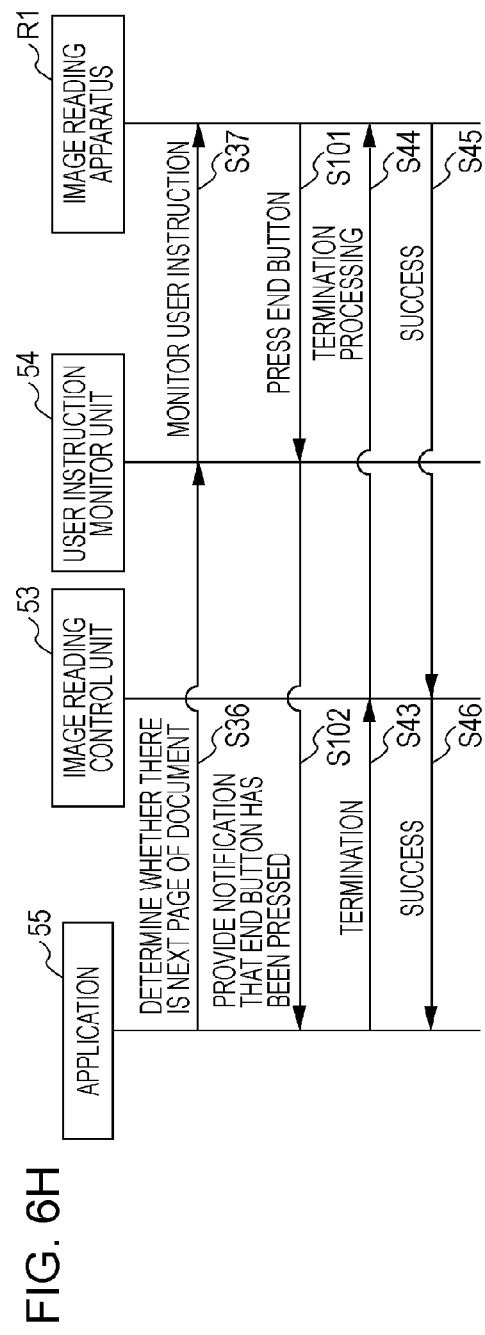

IMAGE PROCESSING METHOD AND COMPUTER-READABLE STORAGE MEDIUM

BACKGROUND OF THE INVENTION

1. Field of the Invention

The present invention relates to a technique for controlling an image reading apparatus for sequentially reading images of documents placed on a document plate.

2. Description of the Related Art

As a device for digitalizing data of an image displayed on a paper medium and inputting the digitalized data into a PC or the like, an image input device such as an imaging scanner or a multifunction device is used. If an image is read, a user sets a document on an image reading apparatus and presses a reading start instruction button provided with the image reading apparatus so as to start reading of the image.

Such a reading start instruction button and a reading termination instruction button are provided with image reading apparatuses so as to prevent a user who is using the image reading apparatus connected to a network from being interrupted from another user.

However, if the above-described image reading procedure is performed for a plurality of documents and a plurality of read images are stored as one file, it is impossible to transmit file storage start information, file storage continuation information, file storage termination information, etc. to an application and prevent file storage being interrupted by another job.

If a user misplaces a document or places a page different from a desired page on a document plate of an image reading apparatus and discards/cancels a read image, the user is required to move from the image reading apparatus to a personal computer so as to retrieve the read image and discard the retrieved image in the personal computer. This is a cumbersome and inefficient operation.

SUMMARY OF THE INVENTION

The present invention provides an image reading system allowing a user to perform image reading and image reading cancellation a plurality of times and store read images as one file without being interrupted only by exclusively operating an image reading apparatus.

According to an embodiment of the present invention, there is provided a control method for an image reading system provided with an image reading apparatus and a processing apparatus for receiving image data from the image reading apparatus and storing the received image data as a file. The control method includes: causing the image reading apparatus to perform a reading step of reading image data of one page under control of the processing apparatus and transmitting the read image data to the processing apparatus; causing the image reading apparatus to perform a start instructing step of transmitting to the processing apparatus a start instruction for starting sequential image reading; causing the image reading apparatus to perform a continuation instructing step of transmitting to the processing apparatus a continuation instruction for continuously reading image data of the next page; causing the image reading apparatus to perform a termination instructing step of transmitting to the processing apparatus a termination instruction for terminating the sequential image reading; causing the image reading apparatus to perform a cancellation instructing step of transmitting to the processing apparatus a cancellation instruction for canceling image reading; causing the processing apparatus to perform a receiving step of receiving from the image reading apparatus the start instruction, the continuation instruction, the termination instruction, and the cancellation instruction; causing the processing apparatus to perform a reading controlling step of controlling the image reading apparatus so as to cause the image reading apparatus to perform the reading step and receiving from the image reading apparatus the read image data; and causing the processing apparatus to perform a storing step of storing image data of at least one page received from the image reading apparatus in a period between reception of the start instruction and reception of the termination instruction as one file. After receiving the start instruction in the receiving step, the processing apparatus performs the reading controlling step. In a case where the processing apparatus receives the cancellation instruction in the receiving step while causing the image reading apparatus to perform the reading step in the reading controlling step, the image processing apparatus causes the image reading apparatus to terminate the reading step and deletes image data of a page being read. In a case where after the reading step has been performed in the reading controlling step, i) the processing apparatus receives the termination instruction in the receiving step, the processing apparatus terminates the reading controlling step and performs the storing step, ii) the processing apparatus receives the continuation instruction in the receiving step, the processing apparatus causes the image reading apparatus to perform the next reading step, or iii) the processing apparatus receives the cancellation instruction in the receiving step, the processing apparatus performs controlling processing for deleting image data that has been acquired in the last reading step and has yet to be stored.

Further features of the present invention will become apparent from the following description of exemplary embodiments with reference to the attached drawings.

BRIEF DESCRIPTION OF THE DRAWINGS

FIG. 5 is a flowchart illustrating the processes performed by an application, an image reading control unit, and a user instruction monitor unit.

FIG. 6A is a diagram illustrating the process performed when a cancellation button is pressed during image reading.

FIG. 6B is a diagram illustrating the process performed when image acquisition fails during image reading.

FIG. 6C is a diagram illustrating the process performed when a total image data amount of acquired pieces of image data does not reach an image data amount set in advance.

FIG. 6D is a diagram illustrating the process performed when a total image data amount of acquired pieces of image data reaches an image data amount set in advance.

FIG. 6E is a diagram illustrating the process performed when a cancellation button is pressed in a user instruction monitoring state.

FIG. 6G is a diagram illustrating the process performed when a clear button is pressed in the user instruction monitoring state.

FIG. 6H is a diagram illustrating the process performed when an end button is pressed in the user instruction monitoring state.

DESCRIPTION OF THE EMBODIMENTS

Figure 1:
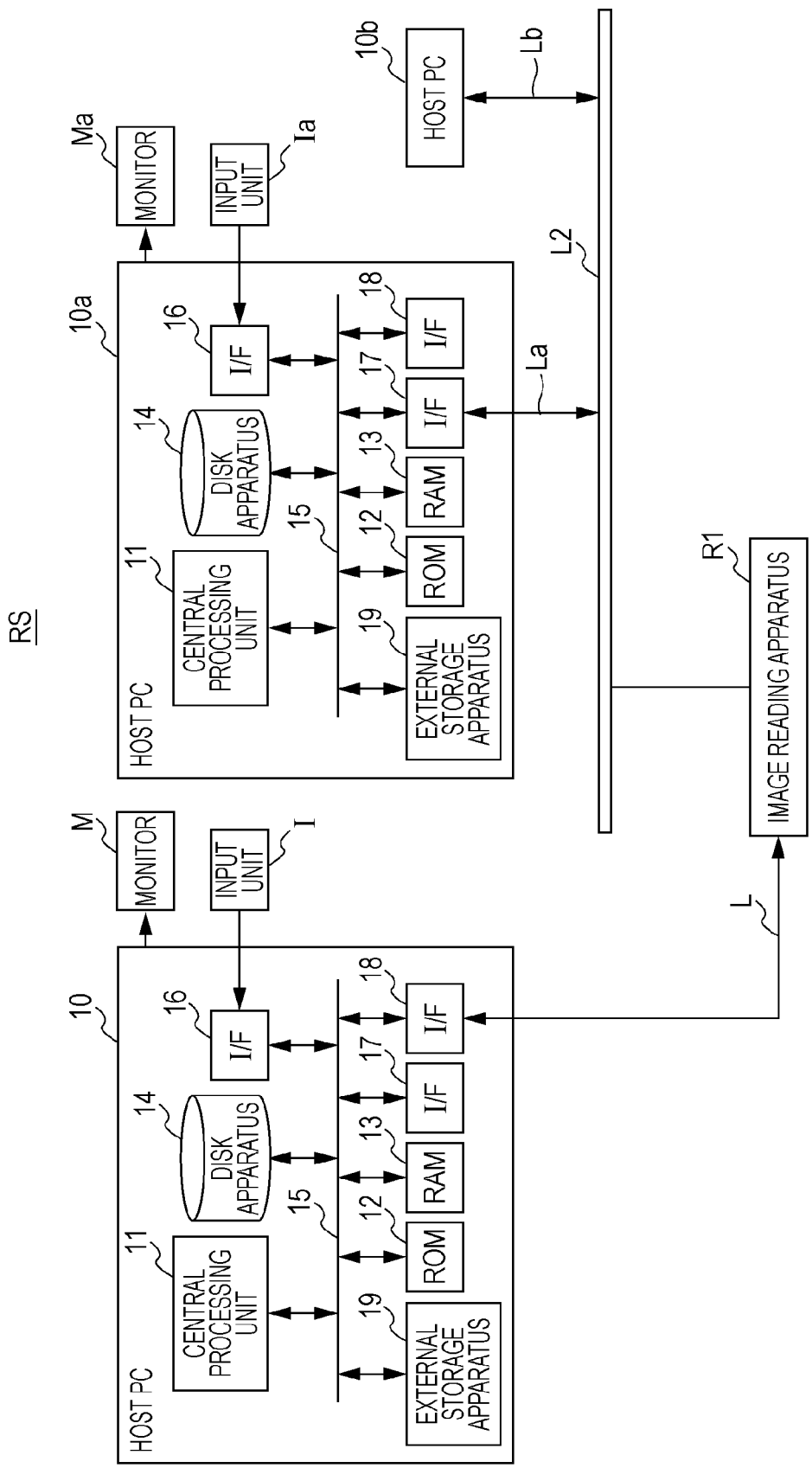
FIG. 1 is a block diagram of an image reading system according to a first embodiment of the present invention.

FIG. 1 is a block diagram illustrating an image reading system RS according to a first embodiment of the present invention. The image reading system RS includes host PCs 10, 10a, and 10b and an image reading apparatus R1.

The host PC 10 includes a central processing unit 11, a ROM 12, a RAM 13, a disk apparatus 14, a bus 15, an I/F 16, an I/F 17, an I/F 18, and an external storage apparatus 19.

The central processing unit 11 performs processing in accordance with a program stored in the RAM 13. The ROM 12 stores a program for a basic input output system (BIOS). An OS, a control program for the image reading apparatus R1, etc. are loaded into the RAM 13. The RAM 13 has a storage area required for the operation of the above-described control program and a work area.

The disk apparatus 14 stores an OS and a control program for the image reading apparatus R1. The bus 15 connects the above-described components to each other, and transfers data among the above-described components. The I/F 16 is connected to an input unit I including a mouse and a keyboard.

The external storage apparatus 19 drives a disk, a CD-ROM, etc. If the above-described program is not stored in the RAM 13 in advance and is stored in a CD-ROM or the like, the external storage apparatus 19 reads out the program from the CD-ROM and downloads the read program into the RAM 13. A single image reading apparatus R1 is connected to at least one host PC (in this example, three host PCs).

A communication line L connects the image reading apparatus R1 to the I/F 18 included in the host PC 10, and is compliant with, for example, USB, IEEE1394, or SCSI. A communication line L2 connects the image reading apparatus R1 to host PCs 10a and 10b using communication lines La and Lb, respectively, and is, for example, a LAN (Local Area Network) or WAN (Wide Area Network).

The configuration of the host PCs 10a and 10b is the same as that of the host PC 10.

Figure 2:
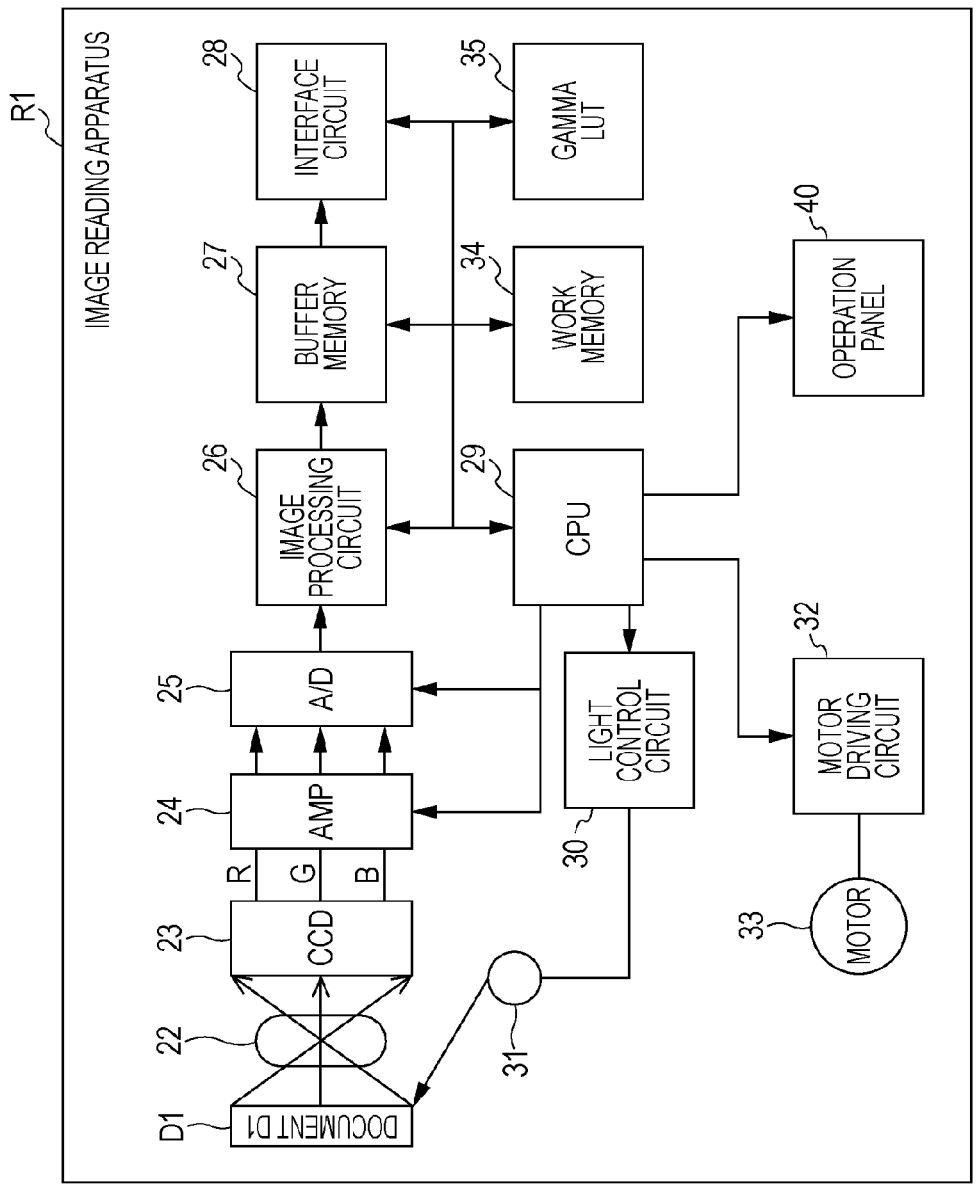
FIG. 2 is a block diagram of an image reading apparatus.

FIG. 2 is a block diagram of the image reading apparatus R1. The image reading apparatus R1 includes an image-forming lens 22, a CCD 23 that is an example of a solid-state image pickup device, an AMP 24, an A/D converter 25, an image processing circuit 26, a buffer memory 27, an interface circuit 28, a CPU 29, a light control circuit 30, a light source lamp 31, a motor driving circuit 32, an optical driving motor 33, a work memory 34, a gamma LUT 35, and an operation panel 40.

The AMP 24 amplifies an analog image signal output from the CCD 23 that is a line image sensor. The A/D converter 25 converts the analog image signal output from the AMP 24 into a digital image signal. The image processing circuit 26 performs pieces of image processing such as offset compensation, shading compensation, digital gain control, color balance control, color masking conversion, and resolution conversion in a main scanning direction and a sub scanning direction upon the digital image signal.

The buffer memory 27 includes a RAM, and temporarily stores image data. The interface circuit 28 is used to receive/output a command and an image from/to a host PC connected thereto.

The CPU 29 is a controller for controlling the image reading apparatus R1 in accordance with a command transmitted from a host PC connected thereto, and controls the motor driving circuit 32, the light control circuit 30, the image processing circuit 26, etc.

The light control circuit 30 drives and turns on the light source lamp 31. The light source lamp 31 illuminates a document D1. Light that is reflected from the document D1 in accordance with the surface density of the document D1 is formed on a line image sensor such as the CCD 23, which is an example of a solid-state image pickup device, as an image via the image-forming lens 22.

The motor driving circuit 32 drives the optical drive motor 33 such as a stepper motor, and outputs an excitation signal to the optical drive motor 33 on the basis of a control signal transmitted from the CPU 29 that is a system control unit for the image reading apparatus R1.

The work memory 34 is used as a temporary work memory used for image processing performed by the image processing circuit 26. Furthermore, the work memory 34 is used for the correction of RGB interlinear offsets of image signals obtained from RGB line sensors disposed in parallel with each other at predetermined offset intervals on the CCD 23 such as a line image sensor. Still furthermore, the work memory 34 temporarily stores various pieces of data including shading correction data.

The gamma LUT 35 stores a density gamma conversion LUT and performs gamma correction.

The CPU 29 detects pressing of a switch disposed on the operation panel 40, and notifies a host PC connected thereto of the fact that the switch has been pressed via an interface.

Figure 3:
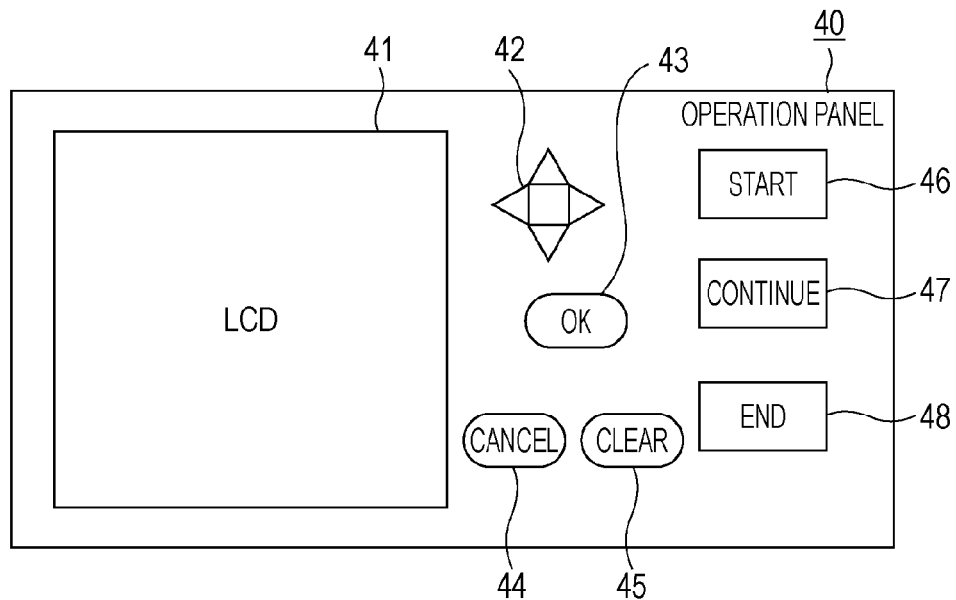
FIG. 3 is a diagram illustrating an operation panel.

FIG. 3 is a diagram illustrating the operation panel 40. The operation panel 40 includes an LCD 41 for displaying scanning information, etc., an operation button 42, an OK button 43, a cancellation button 44, a clear button 45, a start button 46, a continuation button 47, and an end button 48.

The LCD 41 displays scanning setting items including a color mode, a resolution, and a size. If the OK button 43 is pressed after one of the setting items has been selected using the operation button 42, the setting of scanning, for example, a color mode, a resolution, or a size can be performed. If the cancellation button 44, the clear button 45, the start button 46, the continuation button 47, and the end button 48 are pressed, corresponding instruction signals are transmitted to a host PC connected to the operation panel 40.

The start button 46 is an example of a reading start instruction unit for transmitting an image reading start instruction. The continuation button 47 is an example of a reading continuation instruction unit for transmitting an image reading continuation instruction. The end button 48 is an example of a reading termination instruction unit for transmitting an image reading termination instruction. The cancellation button 44 is an example of a reading cancellation instruction unit for transmitting an image reading cancellation instruction.

Figure 4:
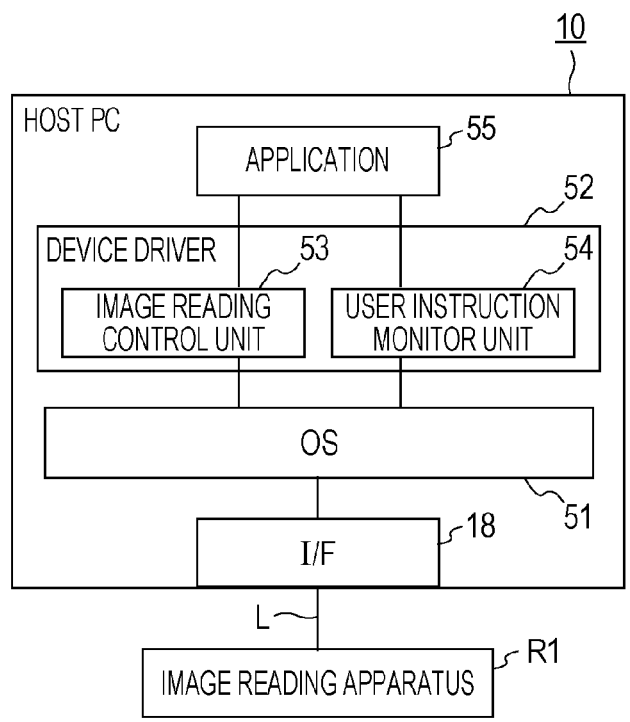
FIG. 4 is a block diagram illustrating the relationship among programs performed in an image reading system.

FIG. 4 is a block diagram illustrating the relationship among programs performed in the image reading system RS. The host PC 10 includes an OS 51, a device driver 52, an application 55, and the I/F 18. The device driver 52 includes an image reading control unit 53 and a user instruction monitor unit 54. Each program is installed in the disk apparatus 14 included in the host PC 10. If a user or another program calls a program, the called program is loaded into the RAM 13 and is then executed.

If the host PC 10 is turned on, the OS 51 is activated. The user instruction monitor unit 54 for monitoring ON/OFF of a user operation button is called when the OS 51 is activated and is resident in the RAM 13. Furthermore, the user instruction monitor unit 54 transmits signals to the image reading apparatus R1 at regular intervals, and determines which of the clear button 45, the start button 46, the continuation button 47, and the end button 48 has been pressed by checking a response signal transmitted from the image reading apparatus R1.

The application 55 is called when the pressing of the start button 46 is detected by the user instruction monitor unit 54. Furthermore, the application 55 calls the image reading control unit 53, reads an image in accordance with a condition set by a user, and performs image processing set in advance.

The configuration of the host PCs 10a and 10b included in the image reading system RS is the same as that of the host PC 10.

The image reading control unit 53 is an example of an image reading control unit for controlling an image reading apparatus so as to cause the image reading apparatus to read an image.

FIG. 5 is a flowchart illustrating processes performed by the application 55, the image reading control unit 53, and the user instruction monitor unit 54. The application 55 transmits a command to the image reading apparatus R1 and receives a result from the image reading apparatus R1 via the image reading control unit 53. The image reading control unit 53 is controlled by the application 55, and functions as a communication interface between the application 55 and the image reading apparatus R1. The processes performed by the image reading control unit 53 and the application 55 are illustrated on the left side of a dotted line in FIG. 5, and the process performed by the user instruction monitor unit 54 is illustrated on the right side of the dotted line in FIG. 5.

As described previously, the user instruction monitor unit 54 is called when the OS 51 is activated and is resident in the RAM 13 (step S1) so as to periodically determine whether a start button of the image reading apparatus R1 has been pressed. The user instruction monitor unit 54 repeats the above-described processing until an instruction is transmitted thereto (step S2). A user sets a desired image transmission destination host PC, a desired resolution, a desired color mode, a desired image size, etc. and then presses the start button 46. If the user instruction monitor unit 54 determines that the start button 46 has been pressed, it adds an argument representing the user instruction monitor unit 54 to a call to be transmitted to the application 55, and transmits the call to the application 55 (step S3).

If the application 55 recognizes that it has been called by the user instruction monitor unit 54, it calls the image reading control unit 53 so as to perform initialization processing (step S4). The application 55 checks the argument added by the user instruction monitor unit 54 and performs an image reading setting on the basis of the argument (step S5). The application 55 acquires data blocks each having a data amount set in advance into which data of a single document is divided (step S6).

The user instruction monitor unit 54 determines whether the cancellation button 44 has been pressed by the user each time one of these data blocks is acquired (step S7). If the user instruction monitor unit 54 determines that the cancellation button 44 has been pressed, it deletes the image data of the document being acquired (step S8), cancels the image acquisition of the current document, and is in a user instruction monitoring state so as to determine whether the next document to be read is present (steps S10, S12, S13, and S15). If the user instruction monitor unit 54 cannot determine that the cancellation button 44 has been pressed, it is determined whether the total image data amount of acquired data blocks reaches a desired image data amount so as to determine whether the acquisition of all of the data blocks corresponding to the single document has been completed (step S9). If the total image data amount of the acquired data blocks does not reach the desired image data amount of the single document, the application 55 determines that the acquisition of all of the data blocks has not been completed and acquires the next data block (step S6). If the total image data amount of the acquired data blocks reaches the desired image data amount of the single document, it is determined that the acquisition of all of the data blocks has been completed and the user instruction monitor unit 54 is in the user instruction monitoring state so as to determine whether the next document to be read is present (steps S10, S12, S13, and S15).

If images are acquired from a document feeding unit such as an automatic document feeder (ADF) on which a plurality of documents can be set at a time, it is determined that the acquisition of all of pieces of image data has been completed when all of these set documents are acquired.

In the user instruction monitoring state (steps S10, S12, S13, and S15), the user instruction monitor unit 54 periodically determines whether the cancellation button 44, the continuation button 47, the clear button 45, and the end button 48 have been pressed until it determines that any one of these buttons has been pressed.

If the user instruction monitor unit 54 determines that the cancellation button 44 has been pressed (step S10), the last acquired image data of one page of the document is deleted (step S11) and the user instruction monitor unit 54 is in the user instruction monitoring state again (steps S10, S12, S13, and S15). If the user instruction monitor unit 54 determines that the continuation button 47 has been pressed (step S12), the image reading setting is performed again (step S5) and image acquisition is performed (step S6). If the user instruction monitor unit 54 determines that the clear button 45 has been pressed (step S13), all of acquired pieces of image data are deleted (step S14) and termination processing is performed (step S16). If the user instruction monitor unit 54 determines that the end button 48 has been pressed, acquired pieces of image data of a plurality of pages are stored as one file (step S17).

An image storage unit stores images received in a period between step S2 in which the start instruction unit transmits a start instruction and step S15 in which the termination instruction unit transmits a termination instruction as one file. Subsequently, the process returns to step S2 in which the start button 46 is monitored.

In step S5, the image reading control unit 53 transmits information about the image reading setting and a lock command for locking the image reading apparatus R1 to the image reading apparatus R1. Upon receiving the lock command, the image reading apparatus R1 is in an exclusion state in which the image reading apparatus R1 receives a command only from the image reading control unit 53 that has transmitted the lock command thereto. If a command is transmitted to the image reading apparatus R1 from the image reading control unit 53 included in another host PC, the image reading apparatus R1 transmits a busy error to the image reading control unit 53 in response to the command.

In step S16, the image reading control unit 53 transmits a termination command and an image reading apparatus unlock command to the image reading apparatus R1. Upon receiving the unlock command, the image reading apparatus R1 cancels the exclusion state so as to receive a command from the image reading control unit 53 included in each of all host PCs connected thereto.

FIG. 6A illustrates details of the process performed when the start button 46 of the image reading apparatus R1 is pressed (step S2), image reading is started, and the cancellation button 44 is pressed during image reading (step S7).

When the user instruction monitor unit 54 determines whether the start button 46 has been pressed (step S21), a user selects one of host PCs and presses the start button 46 of the image reading apparatus R1. The user instruction monitor unit 54 installed in the selected host PC detects the pressing of the start button 46 (step S22). The user instruction monitor unit 54 activates the application 55 and transmits a notification that the start button 46 has been pressed to the application 55 (step S23).

The application 55 activates the image reading control unit 53 (step S24). The activated image reading control unit 53 communicates with the image reading apparatus R1 so as to perform initialization processing (step S25). If the initialization processing is successfully performed, the image reading apparatus R1 transmits a notification that the initialization processing has been successfully performed to the image reading control unit 53 (step S26). The image reading control unit 53 transmits a notification that it has been successfully activated to the application 55 (step S27).

Subsequently, the application 55 transmits information about image reading settings to the image reading control unit 53 (step S28). The image reading control unit 53 transmits the information about the image reading settings to the image reading apparatus R1 (step S29). The image reading apparatus R1 transmits a notification that the image reading settings have been correctly completed to the image reading control unit 53 (step S30). The image reading control unit 53 transmits a notification that the image reading settings have been successfully performed to the application 55 (step S31). The image reading settings include the settings of a reading size, a resolution, a color, sharpness, etc.

Subsequently, the application 55 transmits an image acquisition command to the image reading control unit 53 (step S32). The image reading control unit 53 transmits the image acquisition command to the image reading apparatus R1 (step S33). At that time, if the user presses the cancellation button 44, the user instruction monitor unit 54 detects the pressing of the cancellation button 44 (step S34) and transmits a notification that the cancellation button 44 has been pressed to the application 55 (step S35). The application 55 deletes image data being acquired and transmits an instruction for causing the user instruction monitor unit 54 to determine whether the next page of the document is present to the user instruction monitor unit 54 (step S36). The user instruction monitor unit 54 is in the user instruction monitoring state (step S37) and periodically causes the image reading apparatus R1 to determine whether the cancellation button 44, the continuation button 47, the clear button 45, and the end button 48 have been pressed.

FIG. 6B illustrates the process performed when the start button 46 is pressed, image acquisition is started, and the image acquisition is failed in the middle of the image acquisition. The process illustrated in FIG. 6B is performed after the process from step S21 to step S33 in FIG. 6A.

If the image reading apparatus R1 fails to perform image acquisition due to an error, for example, the disconnection between the image reading apparatus R1 and a host PC, it transmits a notification that the image acquisition has failed to the image reading control unit 53 (step S41). The image reading control unit 53 transmits the notification that the image acquisition has failed to the application 55 (step S42). The application 55 deletes image data being acquired and transmits a termination command to the image reading control unit 53 (step S43).

The image reading control unit 53 communicates with the image reading apparatus R1 so as to perform termination processing (step S44). The image reading apparatus R1 transmits a notification that the termination processing has been successfully completed to the image reading control unit 53 (step S45). The image reading control unit 53 transmits a notification that the termination processing has been successfully completed to the application 55 (step S46). The application 55 stores pieces of image data of a plurality of pages acquitted in a period between step S23 in which an activation command is transmitted and step S46 in which a termination success notification is transmitted as one file.

FIG. 6C illustrates the process performed when the start button 46 of the image reading apparatus R1 is pressed, image acquisition is started, and the total image data amount of acquired pieces of image data does not reach an image data amount set in advance. The process illustrated in FIG. 6C is performed after the process from step S21 to step S33 in FIG. 6A.

If the image reading apparatus R1 successfully performs image acquisition, it transmits a notification that the image acquisition has been successfully performed to the image reading control unit 53 (step S51). The image reading control unit 53 compares a total image data amount of pieces of image data acquired after image reading has been started with an image data amount set in image reading setting processing. If the total image data amount does not reach the image data amount set in advance, the image reading control unit 53 transmits image data and an image acquisition incompletion notification to the application 55 (step S52). After the application 55 has received the image acquisition incompletion notification, the process returns to step S32 in which the application 55 transmits an image acquisition command to the image reading control unit 53 so as to acquire image data. The above-described processing is repeated until all of pieces of image data are acquired.

FIG. 6D illustrates the process performed when the start button 46 of the image reading apparatus R1 is pressed, image acquisition is started, and a total image data amount of acquired pieces of image data reaches an image data amount set in advance. The process illustrated in FIG. 6D is performed after the process from step S21 to step S33 in FIG. 6A.

The image reading control unit 53 receives image data and a notification that image acquisition has been successfully performed from the image reading apparatus R1 and compares a total image data amount of pieces of image data acquired after image reading has been started with a image data amount set in the image reading setting processing. If the total image data amount reaches the image data amount set in the image reading setting processing, the image reading control unit 53 transmits image data and an image acquisition completion notification to the application 55 (step S61). The application 55 determines whether the next page of a document is present and transmits a result of the determination to the user instruction monitor unit 54 (step S36). The user instruction monitor unit 54 is in the user instruction monitoring state (step S37), and periodically causes the image reading apparatus R1 to determine whether the cancellation button 44, the continuation button 47, the clear button 45, and the end button 48 have been pressed.

FIG. 6E illustrates the process performed when the user instruction monitor unit 54 is in the user instruction monitoring state and a user presses the cancellation button 44 of the image reading apparatus R1 (step S10).

The user instruction monitor unit 54 is in the user instruction monitoring state (step S37) and periodically causes the image reading apparatus R1 to determine whether the cancellation button 44, the continuation button 47, the clear button 45, and the end button 48 have been pressed. If a user presses the cancellation button 44 of the image reading apparatus R1, the user instruction monitor unit 54 detects the pressing of the cancellation button 44 (step S71). The user instruction monitor unit 54 transmits a notification that the cancellation button 44 has been pressed to the application 55 (step S72). The application 55 deletes the last acquired image data of one page of a document and transmits an instruction for determining whether the next page of the document is present to the user instruction monitor unit 54 (step S36). The user instruction monitor unit 54 is in the user instruction monitoring state (step S37) and periodically causes the image reading apparatus R1 to determine whether the cancellation button 44, the continuation button 47, the clear button 45, and the end button 48 have been pressed.

Figure 6F:
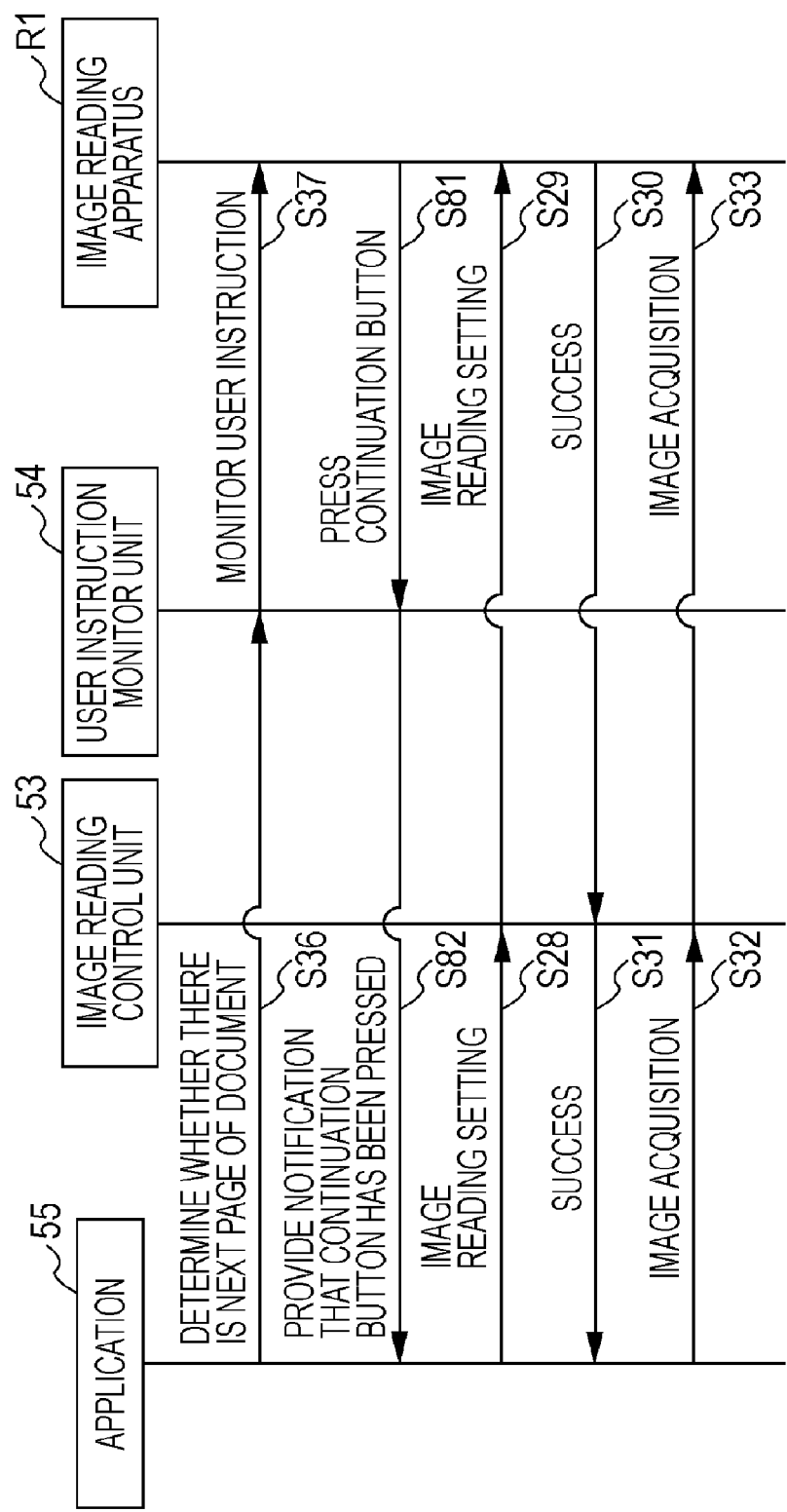
FIG. 6F is a diagram illustrating the process performed when a continuation button is pressed in the user instruction monitoring state.

FIG. 6F illustrates the process performed when the user instruction monitor unit 54 is in the user instruction monitoring state and a user presses the continuation button 47 of the image reading apparatus R1.

If the user instruction monitor unit 54 is in the user instruction monitoring state (step S37) and periodically causes the image reading apparatus R1 to determine whether the cancellation button 44, the continuation button 47, the clear button 45, and the end button 48 have been pressed. If a user presses the continuation button 47 of the image reading apparatus R1, the user instruction monitor unit 54 detects the pressing of the continuation button 47 (step S81).

The user instruction monitor unit 54 transmits a notification that the continuation button 47 has been pressed to the application 55 (step S82). The application 55 transmits information about image reading settings to the image reading control unit 53 again (step S28) and performs image acquisition (step S32).

FIG. 6G illustrates the process performed when the user instruction monitor unit 54 is in the user instruction monitoring state and a user presses the clear button 45 of the image reading apparatus R1.

The user instruction monitor unit 54 is in the user instruction monitoring state (step S37) and periodically causes the image reading apparatus R1 to determine whether the cancellation button 44, the continuation button 47, the clear button 45, and the end button 48 have been pressed. If a user presses the clear button 45 of the image reading apparatus R1, the user instruction monitor unit 54 detects the pressing of the clear button 45 (step S91).

The user instruction monitor unit 54 transmits a notification that the clear button 45 has been pressed to the application 55 (step S92). The application 55 deletes all of pieces of image data acquired in a period between step S23 in which an activation command is transmitted and step S92 in which a notification that the clear button 45 has been pressed is transmitted, and transmits a termination command to the image reading control unit 53 (step S43). The image reading control unit 53 communicates with the image reading apparatus R1 so as to perform termination processing (step S44).

The image reading apparatus R1 transmits a notification that the termination processing has been successfully performed to the image reading control unit 53 (step S45). The image reading control unit 53 transmits a notification that the termination processing has been successfully performed to the application 55 (step S46).

FIG. 6H illustrates the process performed when the user instruction monitor unit 54 is in the user instruction monitoring state and a user presses the end button 48 of the image reading apparatus R1.

The user instruction monitor unit 54 is in the user instruction monitoring state (step S37) and periodically causes the image reading apparatus R1 to determine whether cancellation button 44, the continuation button 47, the clear button 45, and the end button 48 have been pressed.

If a user presses the end button 48 of the image reading apparatus R1 (step S101), the user instruction monitor unit 54 detects the pressing of the end button 48. The user instruction monitor unit 54 transmits a notification that the end button 48 has been pressed to the application 55 (step S102). The application 55 transmits a termination command to the image reading control unit 53 (step S43). The image reading control unit 53 communicates with the image reading apparatus R1 so as to perform termination processing (step S44). The image reading apparatus R1 transmits a notification that the termination processing has been successfully performed to the image reading control unit 53 (step S45). The image reading control unit 53 transmits a notification that the termination processing has been successfully performed to the application 55 (step S46). The application 55 stores pieces of image data of a plurality of pages acquired in a period between step S23 in which an activation command is transmitted and step S46 in which a notification that the termination processing has been successfully performed is transmitted as one file.

The image reading apparatus R1 according to an embodiment of the present invention may be applied to a scanner having only an image reading function or a multifunction device in which a printer, a facsimile, and a scanner are integrated. If the image reading apparatus R1 is applied to a multifunction device, commands other than image reading commands, for example, a print command and a fax command transmitted from a host PC or another host PC, may be rejected while the above-described exclusion control processing is performed.

If a user specifies the number of sheets of a document to be read for the image reading apparatus R1, the first embodiment can be applied.

In order to achieve the above-described objects, a computer-readable storage medium storing program code of software achieving functions of the above-described embodiments may be supplied to a system or an apparatus and a computer (or a CPU or MPU) included in the system or apparatus may read the program code from the computer-readable storage medium and execute the read program code. In this case, the program code itself read from the computer-readable storage medium achieves the functions of the above-described embodiments. Accordingly, the present invention includes the computer-readable storage medium storing the program code.

According to the above-described embodiments, it is possible to store a plurality of read images in a personal computer as one file only by operating an instruction unit provided with an image reading apparatus and scanning a desired number of sheets of a document. During storing processing, a user can exclusively use the image reading apparatus and prevent the occurrence of an interrupt of another job. Even if a user sets a document different from a desired document, the user can delete falsely read image data only by operating the instruction unit provided with the image reading apparatus.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-118822 filed Apr. 30, 2008, which is hereby incorporated by reference herein in its entirety.

What is claimed is:

1. A control method for an image reading system provided with an image reading apparatus and a processing apparatus for receiving image data from the image reading apparatus and storing the received image data as a file, comprising:

causing the image reading apparatus to perform a reading step of reading image data of one page document placed on a document plate under control of the processing apparatus and transmitting the read image data to the processing apparatus;

causing the image reading apparatus to perform a start instructing step of transmitting to the processing apparatus a start instruction for starting sequential image reading;

causing the image reading apparatus to perform a continuation instructing step of transmitting to the processing apparatus a continuation instruction for continuously reading image data of the next page;

causing the image reading apparatus to perform a termination instructing step of transmitting to the processing apparatus a termination instruction for terminating the sequential image reading;

causing the image reading apparatus to perform a cancellation instructing step of transmitting to the processing apparatus a cancellation instruction for canceling image reading;

causing the processing apparatus to perform a receiving step of receiving from the image reading apparatus the start instruction, the continuation instruction, the termination instruction, and the cancellation instruction;

causing the processing apparatus to perform a reading controlling step of controlling the image reading apparatus so as to cause the image reading apparatus to perform the reading step and receiving from the image reading apparatus the read image data; and causing the processing apparatus to perform a storing step of storing image data of at least one page received from the image reading apparatus in a period between reception of the start instruction and reception of the termination instruction as one file, and wherein, after receiving the start instruction in the receiving step, the processing apparatus performs the reading controlling step, wherein, in a case where the processing apparatus receives the cancellation instruction in the receiving step while causing the image reading apparatus to perform the reading step in the reading controlling step, the image processing apparatus causes the image reading apparatus to terminate the reading step and deletes image data of a page being read, and wherein, after the reading step has been performed in the reading controlling step, i) in a case where the processing apparatus receives the termination instruction in the receiving step, the processing apparatus terminates the reading controlling step and performs the storing step, ii) in a case where the processing apparatus receives the continuation instruction in the receiving step, the processing apparatus causes the image reading apparatus to perform the next reading step, or iii) in a case where the processing apparatus receives the cancellation instruction in the receiving step, the processing apparatus performs controlling processing for deleting image data that has been acquired in the last reading step and has yet to be stored.

2. The control method according to claim 1, further comprising causing the image reading apparatus to transmit to the processing apparatus a delete instruction for deleting all of pieces of image data that have yet to be stored, and wherein, upon receiving the delete instruction from the image reading apparatus, the processing apparatus deletes all of pieces of image data that have yet to be stored in the storing step and terminates the reading controlling step.

3. The control method according to claim 1, wherein the processing apparatus periodically monitors a state of the image reading apparatus in the receiving step.

4. The control method according to claim 1, wherein the processing apparatus continues the reading controlling step in a period between reception of the start instruction and reception of the termination instruction, and the image reading apparatus is out of control of another processing apparatus different from the processing apparatus in which the reading controlling step is being continued.

5. A non-transitory computer-readable medium storing a program executed in a processing apparatus connected to an image reading apparatus including an image reading unit, a start instruction unit, a continuation instruction unit, a termination instruction unit, and a cancellation instruction unit, the program readable by the processing apparatus comprising:

a receiving step of receiving a start instruction, a continuation instruction, a termination instruction, and a cancellation instruction from the start instruction unit, the continuation instruction unit, the termination instruction unit, and the cancellation instruction unit, respectively, which are included in the image reading apparatus;

a reading controlling step of controlling the image reading apparatus so as to cause the image reading unit to perform image reading of a document placed on a document plate and receiving read image data from the image reading apparatus; and a storing step of storing image data of at least one page received from the image reading apparatus in a period between reception of the start instruction and reception of the termination instruction as one file, and wherein, after the start instruction has been received in the receiving step, the reading controlling step is performed, wherein, in a case where the cancellation instruction is received in the receiving step while reading of an image of one page is performed in the reading controlling step, the reading of an image of one page is terminated and data of the image being read is deleted, and wherein, after the reading of an image of one page has been performed in the reading controlling step, i) in a case where the termination instruction is received in the receiving step, the reading controlling step is terminated and the storing step is performed, ii) in a case where the continuation instruction is received in the receiving step, reading of the next image is performed, or iii) in a case where the cancellation instruction is received in the receiving step, controlling processing for deleting the last image data of a page that has been read and has yet to be stored is performed.

* * * * *